May 27, 1969

R. D. MOAN 3,446,092

TRUCK TRANSMISSION

Filed Aug. 8, 1966

LOW

INTERMEDIATE

HIGH

REVERSE

RICHARD D. MOAN
INVENTOR.

BY John R. Faulkner
Robert E. McCallum
ATTORNEYS

United States Patent Office 3,446,092
Patented May 27, 1969

3,446,092
TRUCK TRANSMISSION
Richard D. Moan, Dearborn Heights, Mich., assignor to Ford Motor Company, Dearborn, Mich., a corporation of Delaware
Filed Aug. 8, 1966, Ser. No. 570,926
Int. Cl. F16h *37/06*
U.S. Cl. 74—682                                           24 Claims

ABSTRACT OF THE DISCLOSURE

A motor vehicle transmission having three planetary gearsets each of which is conditioned for a reduction drive whenever a drive is transmitted therethrough so that the three forward and reverse drives all provide compound reduction drive ratios to permit the installation of this transmission behind a gas turbine engine without the inclusion of an additional reduction drive gearset.

---

This invention relates to an automatic transmission for a motor vehicle. More particularly, it relates to an automatic transmission for use in a truck powered by a gas turbine engine.

Gas turbine engines that are installed in motor vehicles as the main power plant generally have an output shaft speed in excess of 50,000 r.p.m. A reduction drive train, therefore, generally is placed behind the engine to reduce this speed to a value suitable for driving the input shaft of a conventional automatic transmission. This not only adds to the over-all package cost, but increases the complexity of the power plant, and contributes to a lessening of the wear-life of the power pack.

Therefore, one of the primary objects of the invention is to provide an automatic transmission that provides sufficiently high reduction ratios in all drive ranges to permit the elemination of the conventional gear reduction train normally associated with a motor vehicle type gas turbine engine.

Another object of the invention is to provide a heavy duty three-speed automatic transmission that is relatively simple in construction, easy to assemble and disassemble, economical in operation, and yet provides high reduction drive ratios in all drive ranges.

A further object of the invention is to provide an automatic transmission consisting of three interconnected planetary gearsets, two of which are of the intermeshing planet gear type, the various drive conditions through the transmission being controlled by selectively operable friction clutches and brakes.

Figure 1:
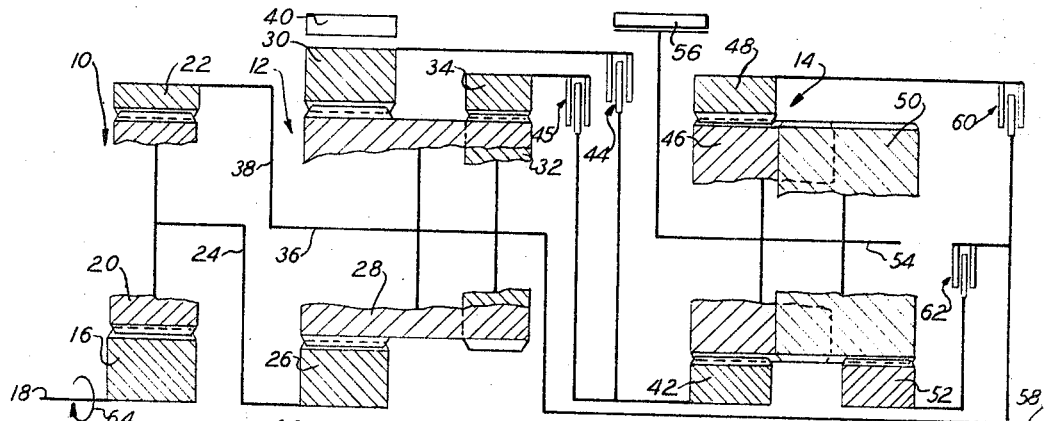
Figure 2:
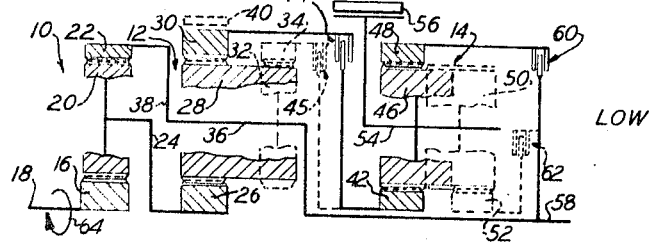
Figure 3:
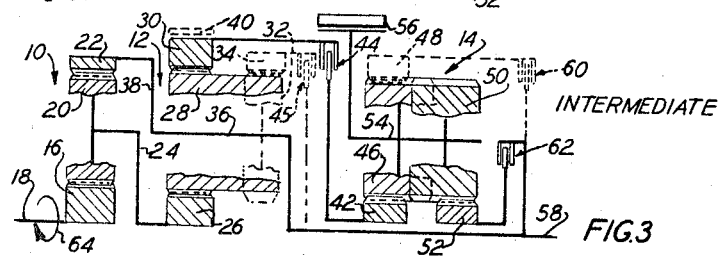
Figure 4:
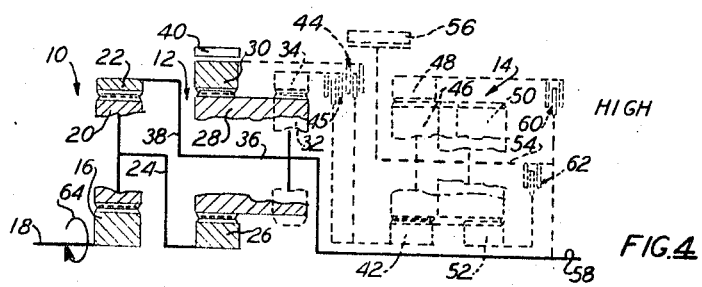

Other objects, features and advantages of the invention will become apparent upon reference to the succeeding, detailed description thereof, and to the drawings illustrating the preferred embodiment thereof; wherein, FIGURE 1 schematically illustrates a cross-sectional view of the upper half of a transmission embodying the invention; and, FIGURES 2, 3, 4 and 5 illustrate the powerflow through the transmission when it is conditioned for the legended drive ranges.

As seen in FIGURE 1, the automatic transmission of the invention consists of three interconnected planetary gearsets 10, 12 and 14, controlled by selectively operable brakes and clutches to provide three forward and a reverse reduction drives and neutral.

More specifically, gearset 10 is of the simple, three-element planetary type. It has a sun gear 16 fixed to a power input shaft 18 that, in this case, would be the gas turbine power turbine shaft. Sun gear 16 meshes with a plurality (only one shown) of circumferentially spaced planet gears 20 that are in constant mesh with a ring gear 22 and are rotatably mounted on a planet gear carrier 24.

Planetary gearset 12 is of the compound, intermeshing planet gear type. It includes a sun gear 26 fixed for rotation with the first gearset carrier 24. Sun gear 26 meshes with a first planet gear 28 that meshes both with a first ring gear 30 and a second planet gear 32. Gear 32 in turn meshes with a second ring gear 34. Both planet gears 28 and 32 are rotatably mounted on a common carrier 36 that is fixed to the first gearset ring gear 22 by an extension 38. A selectively engagable brake band 40 is associated with ring gear 30, and when applied, holds the ring gear against rotation in either direction to establish a High or third speed drive range, in a manner to be described later.

The third planetary gearset 14 is also of the compound, intermeshing planet gear type. It includes a first sun gear 42 selectively connectible either to the second gearset ring gear 30, by a friction disc type clutch 44, or to the ring gear 34 by a clutch 45. Sun gear 42 meshes with a planet gear 46 that meshes both with a ring gear 48 and a second planet gear 50. Planet gear 50 meshes with a second sun gear 52. Both planet gears 46 and 50 are rotatably mounted upon a stationary planet gear carrier 54 that is normally held stationary by the engagement of a fluid pressure actuated brake band 56 that is non-rotatably fixed to a portion of the transmission housing.

Ring gear 48 and sun gear 52, alternately, can be connected directly to the transmission power output shaft 58 (and, therefore, to ring gear 22 and carrier 36) by friction disc type clutches 60 and 62, respectively.

The second and gearset brakes 40 and 56, and the clutch units 44, 45, 60 and 62, all may be of a known fluid pressure engaged, spring-released type. That is brakes 40 and 56 would each consist of a brake band that is circumferentially contractible to engage a friction surface provided respectively on the outer periphery of ring gear 30 and the extension of carrier 54 to hold each stationary as desired. Each of the clutch units could consist of axially spaced, interleaved sets of friction discs, each set being slidably splined to one of the pair of members to be connected, in a known manner.

As stated perviously, brake 56 normally is applied at all times, and brake 40 and each of the clutch units 44, 45, 60 and 62 would be selectively operated by a known type of control system to engage or disengage selected ones of said clutches and brakes in predetermined sequences to provide the various forward speed drive ranges and reverse and neutral, in a manner now to be described.

*Operation*

Neutral is established by disengaging all clutches 44, 45, 60 and 62, and brake 40. Since there is no reaction members in the gearsets and no interconnection between second gearset 12 and third gearset 14, there will be no drive of output shaft 54.

To establish First or Low forward speed drive range (FIGURE 2), clutches 44 and 60 and brake 56 are engaged. Assuming the vehicle is stationary, clockwise or forward rotation of power input shaft 18 and sun gear 16, in the direction of arrow 64, rotates planet gear 20 counterclockwise to apply torque to ring gear 22 to rotate it in a similar direction. However, since ring gear 22 is connected to the stationary load shaft 58 by second gearset carrier 36, the ring gear temporarily remains stationary to act as a reaction member. This causes planet gear 20 to walk clockwise around the inside of ring gear 22 and drive carrier 24 and second gearset sun gear 26 in a clockwise direction. Since carrier 36 also is stationary, planet gear 28 will rotate counterclockwise and drive ring gear 30 and third gearset sun gear 42 (through engaged clutch 44) in the same direction. Third gearset carrier 54 is held stationary by brake 56. The counterclockwise rotation of sun gear 42, therefore, causes a clockwise rotation of ring gear 48, and through engaged clutch 60, rotates output shaft 58 in a clockwise direction.

The reduction in drive from input shaft 18 to output shaft 58 will at this time be a maximum due to the compounding of the reductions through all three planetary gearsets. A typical First or low speed forward drive ratio would be, say, 45:1, for example, which would be sufficient to reduce the 50,000 r.p.m. speed of input shaft 18 to a value suitable for driving a truck in its lowest gear.

Second or intermediate forward speed drive range (FIGURE 3) is established from Low range by disengaging clutch 60 and engaging clutch 62. This, of course, would be accomplished automatically by a suitable known type of control system that would automatically engage and disengage the clutches in timed relationship and as a function of the differential between the change in speed of the vehicle and the torque demand by the vehicle operator, for example.

The direction of rotation of the gears and the operation of the first two gearsets 10 and 12 remain the same for Second speed operation as described in connection with Low speed. The reverse or counterclockwise rotation of sun gear 42, clockwise rotation of planet gear 46, and counterclockwise rotation of planet gear 50, now rotates sun gear 52 in a clockwise or forward rotation to rotate power output shaft 58 in the same direction due to engaged clutch 62. The reduction in this drive range would be, say, 23:1, for example.

Third or High speed forward drive operation (FIGURE 4) bypasses the third gearset 14. That is, all clutches 44, 45, 60 and 62 are disengaged, and only brake 40 is applied to hold second gearset ring gear 30 stationary. Forward or clockwise rotation of input shaft 18 and sun gear 16 again causes a counterclockwise rotation of planet gear 20 and a forward rotation of carrier 24 and second gearset sun gear 26. With ring gear 30 stationary, the planet gear 28 is forced to walk around clockwise within ring gear 30 and thereby drives carrier 36 and first gearset ring gear 22 clockwise. Since a compound reduction is provided only through the first two gearsets, output shaft 58 will be rotated clockwise at a lower ratio reduction drive than that provided during first and second speed operation; or at say, a 12:1 ratio, for example.

Figure 5:
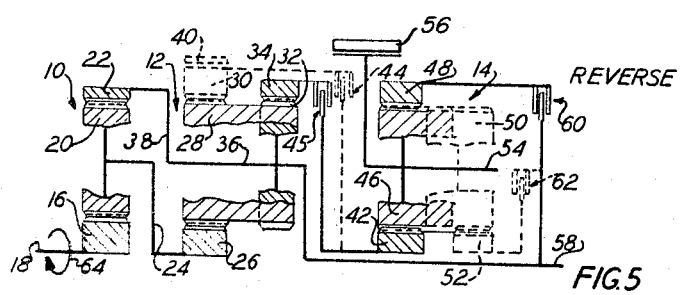

The Reverse drive power flow is shown in FIGURE 5. In this instance, clutches 45 and 60 are engaged and clutches 44 and 62 and brake 40 are disengaged. Second gearset ring gear 30 and third gearset sun gear 52 will now idle freely. Clockwise rotation of input shaft 18 and sun gear 16 causes a counterclockwise rotation of planet gear 20 and a clockwise rotation of carrier 24 and sun gear 26 within the load shaft held ring gear 22. This causes a counterclockwise rotation of planet gear 28 and a clockwise rotation of planet gear 32 to drive ring gear 34 and, therefore, sun gear 42 in the same direction. With carrier 54 stationary, the counterclockwise rotation of planet gear 46 rotates ring gear 48 and thus power output shaft 58 in the same direction. The compound reduction through all three gearsets 10, 12 and 14, therefore, will provide a reduction of, say, 44:1, for example.

From the foregoing, it will be seen that the invention provides a three-speed automatic transmission in which all drive ranges provide high reduction ratios, thereby permitting the elimination of the reduction gear train usually associated with a motor vehicle type gas turbine engine.

While the invention has been illustrated in its preferred embodiment in the figures, it will be clear to those skilled in the arts to which the invention pertains that many changes and modifications may be made thereto without departing from the scope of the invention.

What is claimed is:

1. A transmission having power input and output shafts, and a plurality of interconnected planetary gearsets operatively connecting said shafts, said gearsets each having a plurality of rotatable members, first and second means connecting two of the members of a first gearset respectively to two of the members of a second gearset, other means operatively connecting said input shaft to a member of said first gearset and said output shaft to a third member of said second gearset, and brake means holding stationary a member of one of said gearsets and conditioning said transmission for a plurality of reduction drives therethrough in the same direction, said gearsets each having sun and ring and planet gears and a planet carrier, said first means connecting said first gearset ring gear and second gearset carrier, said second means connecting said first gearset carrier and said second gearset sun gear, third means connecting said second gearset ring gear and a third gearset sun gear, and fourth means connecting said second gearset carrier and said third gearset ring gear.

2. A transmission as in claim 1, said other means connecting said second gearset carrier and third gearset ring gear to said output shaft.

3. A transmission having power input and output shafts, and first and second and third interconnected planetary gearsets operatively connecting said shafts, and said gearsets each having a plurality of rotatable members, first and second means respectively connecting two of the members of a first gearset to two of the members of a second gearset and two of the members of said second gearset to two of the members of said third gearset, other means operatively connecting said input shaft to a member of said first gearset and said output shaft to a member of said third gearset, and a brake means holding stationary a member of one of said gearsets conditioning said transmission for a reduction drive therethrough, said second means including clutch means, said clutch means comprising a selectively operable clutch between each pair of members to be connected.

4. A transmission having power input and output shafts, and first and second and third interconnected planetary gearsets operatively connecting said shafts, said gearsets each having a plurality of rotatable members, first and second means respectively connecting two of the members of a first gearset to two of the members of a second gearset and two of the members of said second gearset to two of the members of said third gearset, other means operatively connecting said input shaft to a member of said first gearset and said output shaft to a member of said third gearset, and a brake means holding stationary a member of one of said gearsets conditioning said transmission for a reduction drive therethrough, said second means connecting said second gearset ring gear and carrier respectively to said third gear sun and ring gears.

5. A transmission having power input and output shafts, and first and second and third interconnected planetary gearsets operatively connecting said shafts, said gearsets each having a plurality of rotatable members, first and second means respectively connecting two of the members of a first gearset to two of the members of a second gearset and two of the members of said second gearset to two of the members of said third gearset, other means operatively connecting said input shaft to a member of said first gearset and said output shaft to a member of said third gearset, and a brake means holding stationary a member of one of said gearsets conditioning said transmission for a reduction drive therethrough, said first means connecting said first gearset carrier and ring gear respectively to said second gearset sun gear and carrier, said second means connecting said second gearset ring gear and carrier respectively to said third gear sun and ring gears.

6. A transmission as in claim 5, said brake means holding stationary said third gearset carrier.

7. A transmission as in claim 5, said other means connecting said third gearset ring gear to said output shaft.

8. A transmission having power input and output shafts, and first and second and third interconnected planetary gearsets operatively connecting said shafts, said gearsets each having a plurality of rotatable members, first and second means respectively connecting two of the members of a first gearset to two of the members of a second gearset and two of the members of said second gearset to two of the members of said third gearset, other means operatively connecting said input shaft to a member of said first gearset and a said output shaft to a member of said third gearset, and a brake means holding stationary a member of one of said gearsets conditioning said transmission for a reduction drive therethrough,
    said second gearset including intermeshed planet pinions respectively meshed with said gearset and ring and sun gears,
    said second means connecting said second gearset ring gear and carrier respectively to said third gear sun and ring gear.

9. A transmission having power input and output shafts, and first and second and third interconnected planetary gearsets operatively connecting said shafts, said gearsets each having a plurality of rotatable members, first and second means respectively connecting two of the members of a first gearset to two of the members of a second gearset and two of the members of said second gearset to two of the members of said third gearset, other means operatively connecting said input shaft to a member of said first gearset and said output shaft to a member of said third gearset, and a brake means holding stationary a member of one of said gearsets conditioning said transmission for a reduction drive therethrough,
    said second gearset including intermeshed planet pinions respectively meshed with said second gearset sun and ring gears,
    said first means connecting said first gearset carrier and ring gear respectively to said second gearset sun gear and carrier, said second means connecting said second gearset ring gear and carrier respectively to said third gearset sun and ring gears.

10. A transmission as in claim 9, said brake means holding stationary said third gearset carrier.

11. A transmission as in claim 10, said other means connecting said third gearset ring gear to said output shaft.

12. A transmission as in claim 11, said second means including a selectively operable clutch between each pair of members to be connected.

13. A transmission having power input and output shafts, and a plurality of interconnected planetary gearsets operatively connecting said shafts, said gearsets each having a plurality of rotatable members, first and second means connecting two of the members of a first gearset respectively to two of the members of a second gearset, other means operatively connecting said input shaft to a member of said first gearset and said output shaft to a member of said second gearset, and brake means holding stationary a member of one of said gearsets and conditioning said transmission for a reduction drive therethrough,
    said first gearset having sun and ring gears and planet gears and a planet carrier, said second gearset having first and second sun gears meshed respectively with intermeshed pinion gears rotatably mounted on a planet carrier,
    said first means connecting said first gearset ring gear and said second gearset first sun gear, said second means connecting said first gearset carrier and said second gearset second sun gear,
    said first means and second means each including a selectively operable clutch.

14. A transmission having power input and output shafts, and first and second and third interconnected planetary gearsets operatively connecting said shafts, said gearsets each having a plurality of rotatable members, first and second means connecting two of the members of said first gearset respectively to two of the members of a second gearset and two of the members of said second gearset to two of the members of said third gearset, other means operatively connecting said input shaft to a member of said first gearset and said output shaft to a member of said third gearset, and brake means holding stationary a member of one of said gearsets conditioning said transmission for a reduction drive therethrough, said first and second gearsets each having sun and ring and planet gears and a planet carrier, said third gearset having first and second sun gears meshed respectively with intermeshed planet gears rotatably mounted on a planet carrier,
    said second means connecting said second gearset ring gear and carrier respectively to said third gearset first and second sun gears.

15. A transmission as in claim 14, said second means connections each including a selectively operable clutch.

16. A transmission as in claim 14, said other means operatively connecting said first gearset sun gear to said input shaft and said third gearset second sun gear to said output shaft.

17. A transmission as in claim 16, said brake means holding stationary said third gearset carrier.

18. A transmission having power input and output shafts, and first and second and third interconnected planetary gearsets operatively connecting said shafts, said gearsets each having a plurality of rotatable members including at least one sun and ring and planet pinion gears intermeshed, said pinion gear being rotatably mounted on a carrier, said second gearset including a second ring gear and a second planet gear meshed with said second ring gear and said second gearset one planet gear, said third gearset including a second sun gear and a second planet gear intermeshed with said second sun gear and said third gearset one planet gear, first means connecting two of the members of said first gearset respectively to two of the members of a second gearset, second means respectively connecting at least two of the members of said second gearset to two of the members of said third gearset, other means operatively connecting said input shaft to a member of said first gearset and said output shaft to a member of said third gearset, and a plurality of alternately operable and selectively rendered operable brake means when operable holding stationary selective members of said second and third gearsets and conditioning said transmission for reduction drives therethrough, said second means including a selectively operable clutch means between each of the pair of members to be connected when operable establishing the connections between said latter members, the selective rendering operable of said brake and clutch means in different combinations establishing a plurality of reduction drives through said transmission from said input to output shafts.

19. A transmission as in claim 18, said first means connecting said first gearset carrier and ring gear respectively to said second gearset sun gear and carrier.

20. A transmission as in claim 18, said second means connecting said second gearset first ring gear and carrier respectively to said third gearset first and second sun gears.

21. A transmission as in claim 18, said second means connecting said second gearset second ring gear and carrier respectively to said third gearset first sun gear and ring gear.

22. A transmission as in claim 18, said first means connecting said first gearset carrier and ring gear respectively to said second gearset sun gear and carrier, said second means connecting said second gearset first ring gear and carrier respectively to said third gearset first and second sun gears, and said second gearset second ring gear to said third gearset first sun gear.

23. A transmission as in claim 22, said other means connecting said input shaft to said first gearset sun gear and said output shaft to said first gearset ring gear and second gearset carrier.

24. A transmission as in claim 23, said brake means including individual brake means associated with said second gearset ring gear and said third gearset carrier.

References Cited

UNITED STATES PATENTS

| | | | |
|---|---|---|---|
| 1,717,097 | 6/1929 | de Normanville | 74—765 |
| 1,814,096 | 7/1931 | Saki | 74—765 |
| 2,604,798 | 7/1952 | Welsh | 74—705 X |
| 2,612,792 | 10/1952 | Wilson et al. | 74—764 X |
| 2,838,960 | 6/1958 | Simpson | 74—674 X |
| 2,873,624 | 2/1959 | Simpson | 74—765 X |
| 2,892,361 | 6/1959 | Miller | 74—682 |
| 2,923,178 | 2/1960 | Miller | 74—682 X |
| 3,100,405 | 8/1963 | Brass | 74—764 |
| 3,246,542 | 4/1966 | Moan | 74—688 X |
| 3,319,491 | 5/1967 | Simpson | 74—740 |
| 3,067,632 | 12/1962 | Foerster et al. | 74—759 |
| 2,990,727 | 7/1961 | Miller | 74—759 |

ROBERT M. WALKER, *Primary Examiner*.

THOMAS C. PERRY, *Assistant Examiner*.

U.S. Cl. X.R.

74—705, 764